(12) United States Patent
Sueur et al.

(10) Patent No.: US 12,460,324 B2
(45) Date of Patent: Nov. 4, 2025

(54) WRAPPABLE, WOVEN, ABRASION AND EMI RESISTANT SLEEVE

(71) Applicant: FEDERAL-MOGUL POWERTRAIN LLC, Northville, MI (US)

(72) Inventors: Thomas Sueur, Crepy-en-Valois (FR); Damien D'Almeida, Crepy-en-Valois (FR); Sophie Pinceloup, Chelles (FR); Julien Deltor, Margny-les-Compiegne (FR)

(73) Assignee: Systems Protection Group US LLC, Northville, MI (US)

( * ) Notice: Subject to any disclaimer, the term of this patent is extended or adjusted under 35 U.S.C. 154(b) by 0 days.

(21) Appl. No.: 18/639,899

(22) Filed: Apr. 18, 2024

(65) Prior Publication Data

US 2024/0352630 A1    Oct. 24, 2024

Related U.S. Application Data

(60) Provisional application No. 63/497,604, filed on Apr. 21, 2023.

(51) Int. Cl.
*D03D 15/533* (2021.01)
*B32B 1/08* (2006.01)
(Continued)

(52) U.S. Cl.
CPC ............. *D03D 1/0043* (2021.05); *B32B 1/08* (2013.01); *B32B 5/024* (2013.01); *B32B 5/08* (2013.01);
(Continued)

(58) Field of Classification Search
CPC .... D03D 1/0043; D03D 1/0058; D03D 11/02; D03D 15/25; D03D 15/283;
(Continued)

(56) References Cited

U.S. PATENT DOCUMENTS 4,589,942 A * 5/1986 Korinek .................... B32B 5/18
  156/324
7,216,678 B2    5/2007 Baer
(Continued)

FOREIGN PATENT DOCUMENTS

CN    203115331 U    8/2013
CN    113622068 A    11/2021
(Continued)

*Primary Examiner* — Robert H Muromoto, Jr.
(74) *Attorney, Agent, or Firm* — John D. Wright; Dickinson Wright PLLC

(57) ABSTRACT

A woven EMI sleeve has a wall with opposite edges extending lengthwise between opposite ends. The wall is wrapped about a central longitudinal axis into a tubular configuration bounding an enclosed cavity sized for receipt of an elongate member therein. The wall is woven with warp filaments extending generally parallel to the central longitudinal axis and weft filaments extending generally transversely to the warp filaments. The warp filaments include conductive filaments provided as wire filaments and separate non-conductive warp filaments. The weft filaments include heat-set filaments that are heat-formed to bias the wall into the tubular configuration and to bias opposite edges into overlapping relation with one another. The weft filaments also include conductive filaments.

20 Claims, 3 Drawing Sheets

(51) Int. Cl.
*B32B 5/02* (2006.01)
*B32B 5/08* (2006.01)
*B32B 15/14* (2006.01)
*D03D 1/00* (2006.01)
*D03D 11/02* (2006.01)
*D03D 15/25* (2021.01)
*D03D 15/283* (2021.01)
*D03D 15/67* (2021.01)

(52) U.S. Cl.
CPC ........... *B32B 15/14* (2013.01); *D03D 1/0058* (2013.01); *D03D 11/02* (2013.01); *D03D 15/25* (2021.01); *D03D 15/283* (2021.01); *D03D 15/533* (2021.01); *D03D 15/67* (2021.01); *B32B 2262/128* (2021.05); *B32B 2262/148* (2021.05); *B32B 2307/202* (2013.01); *B32B 2597/00* (2013.01); *D10B 2101/20* (2013.01); *D10B 2401/16* (2013.01)

(58) Field of Classification Search
CPC .... D03D 15/533; D03D 15/67; D03D 15/587; B32B 1/08; B32B 5/024; B32B 5/08; B32B 15/14; B32B 2262/128; B32B 2262/148; B32B 2307/202; B32B 2597/00; D10B 2101/20; D10B 2401/16; D10B 2401/041
See application file for complete search history.

(56) References Cited

U.S. PATENT DOCUMENTS

| | | | |
|---|---|---|---|
| 7,235,737 B2* | 6/2007 | Rodrigues | H02G 3/0481 |
| | | | 174/36 |
| 7,681,417 B2 | 3/2010 | Hagihara et al. | |
| 7,824,749 B2* | 11/2010 | Dawes | B32B 15/09 |
| | | | 426/243 |
| 8,669,195 B2* | 3/2014 | Swallow | D03D 1/0088 |
| | | | 442/228 |
| 9,290,876 B2* | 3/2016 | Marcellin | D03D 1/0043 |
| 9,913,415 B2* | 3/2018 | Harris | H05K 9/009 |
| 10,067,527 B2* | 9/2018 | Kuroda | B32B 27/288 |
| 10,183,466 B2* | 1/2019 | Fujino | G02B 1/14 |
| 10,542,645 B2* | 1/2020 | Simoens-Seghers | |
| | | | H05K 9/0067 |
| 10,615,581 B2* | 4/2020 | Knudson | H05K 9/009 |
| 10,794,528 B2* | 10/2020 | Shumate | B32B 37/10 |
| 11,940,082 B2* | 3/2024 | Shumate | B32B 27/12 |
| 2006/0185872 A1* | 8/2006 | Rodrigues | H02G 3/0481 |
| | | | 174/36 |
| 2007/0298260 A1* | 12/2007 | Kanakarajan | H05K 1/0346 |
| | | | 156/244.11 |
| 2016/0309626 A1* | 10/2016 | Simoens-Seghers | |
| | | | D03D 1/0043 |
| 2017/0175945 A1* | 6/2017 | Shumate | B32B 7/06 |
| 2020/0323630 A1 | 10/2020 | Alkhatib et al. | |
| 2020/0400265 A1* | 12/2020 | Shumate | F24F 13/0263 |

FOREIGN PATENT DOCUMENTS

| | | |
|---|---|---|
| WO | 2014163882 A1 | 10/2014 |
| WO | 2016010730 A1 | 1/2016 |
| WO | 2016168794 A1 | 10/2016 |
| WO | 2018144656 A1 | 8/2018 |

* cited by examiner

WRAPPABLE, WOVEN, ABRASION AND EMI RESISTANT SLEEVE

CROSS-REFERENCE TO RELATED APPLICATION

This application claims the benefit of U.S. Provisional Application Ser. No. 63/497,604, filed Apr. 21, 2023, which is incorporated herein by reference in its entirety.

BACKGROUND OF THE INVENTION

1. Technical Field

This invention relates generally to textile sleeves for protecting elongate members, and more particularly to wrappable woven sleeves providing abrasion resistant and electromagnetic interference resistant properties for wires contained therein.

2. Related Art

It is known to contain and protect elongate members, such as wires and wire harnesses, for example, and referred to hereafter simply as wires, in wrappable woven sleeves to provide protection to the wires against electromagnetic interference (EMI). However, known EMI sleeve have wire that can be abrasive to the internal wires and/or to features external to the sleeve. In order to reduce the potential for abrasion of the EMI sleeve against the wire and/or external components, an additional abrasion resistant sleeve(s) having a softer surface and feel (hand) is sometimes applied internally and/or externally to the EMI sleeve, thereby forming a multilayered sleeve. Although the additional abrasion resistant sleeve can be useful in reducing abrasion between the EMI sleeve and the internal and/or external components, the additional layer adds cost, both from a manufacture and assembly standpoint, and bulk (weight and thickness) to the EMI sleeve assembly.

SUMMARY OF THE INVENTION

It is an aspect of the present disclosure to provide a wrappable single layer sleeve that addresses and overcomes at least the drawbacks discussed above for known wrappable, multilayered sleeves.

A wrappable EMI sleeve in accordance with one aspect of the disclosure provides a single layer wrappable sleeve that effectively shields EMI, while also being resistant to abrasion against the wires being protected and/or against external components. The EMI sleeve is also resistant to causing abrasion to the wire and external components. Further, in order to provide optimal protection in physically demanding environments, such as those encountered in motor vehicles and rail applications, by way of example, the EMI sleeve in accordance with the disclosure also possesses high durability, is impact resistant, while being flexible to allow the sleeve to be routed about corners and over meandering paths. Further yet, the sleeve is lightweight and has a low profile, thereby occupying a minimal amount of space.

Accordingly, in accordance with a non-limiting embodiment, a wrappable woven sleeve for routing and protecting an elongate member from exposure to EMI, while further providing mechanical protection against abrasion, impact, and other environmental conditions, such as contamination, is provided. The wall has opposite edges extending lengthwise between opposite ends. The wall is wrapped about a central longitudinal axis into a tubular configuration bounding an enclosed cavity sized for receipt of the elongate member therein. The wall is woven with warp filaments extending generally parallel to the central longitudinal axis and weft filaments extending generally transversely to the warp filaments. The warp filaments include conductive filaments provided as wire filaments and separate non-conductive warp filaments. The weft filaments include heat-set filaments that are formed to bias the wall into a cylindrical shape and to bias opposite edges into overlapping relation with one another. The weft filaments also include conductive filaments.

In accordance with another aspect of the invention, the non-conductive warp filaments form repeating floats extending over and/or under two or more of the weft yarns.

In accordance with another aspect of the invention, the non-conductive warp filaments form repeating floats extending over two or more of the weft yarns, such that the repeating floats face outwardly away from the central longitudinal axis of the wall.

In accordance with another aspect of the invention, the non-conductive warp filaments form repeating floats extending under two or more of the weft yarns, such that the repeating floats face inwardly toward the central longitudinal axis of the wall.

In accordance with another aspect of the invention, the warp wire filaments can be woven in a plain weave pattern.

In accordance with another aspect of the invention, the weft heat-set filaments and the weft conductive filaments alternate with one another in spaced relation along the central longitudinal axis of the sleeve.

In accordance with another aspect of the invention, the weft conductive filaments are metallized filaments.

In accordance with another aspect of the invention, the metallized filaments are metallized non-conductive multifilaments.

In accordance with another aspect of the invention, the metallized filaments are metallized non-conductive monofilaments.

In accordance with another aspect of the invention, the weft conductive filaments are hybrid yarns including a synthetic filament, either monofilament or multifilament, twisted or served with a continuous conductive wire.

In accordance with another aspect of the invention, the non-conductive warp filaments and the warp wire filaments alternate with one another in spaced relation about a circumference of the wall.

In accordance with another aspect of the invention, circumferentially adjacent floats, whether extending along an outer surface of the sleeve or an inner surface of the sleeve, are offset and staggered relative to one another, such that one of the adjacent floats extends axially beyond the other of the adjacent floats, thereby avoiding the formation of continuous annular valleys, and thus, maximizing the protection against abrasion to the wires.

In accordance with another aspect of the invention, the floats extending along an outer surface of the sleeve can be formed to form loop portions of a hook and loop type fastener, thereby being able to be attached to a hook portion of the hook and loop type fastener.

In accordance with another aspect of the invention, the sleeve can consist of a single layer wall that prevents abrading the elongate member and/or external components located adjacent to the sleeve.

In accordance with another aspect of the invention, a wrappable, woven EMI resistant sleeve for routing and protecting an elongate member consists of: a single layer wall having opposite edges extending lengthwise between opposite ends. The wall is self-wrapping about a central longitudinal axis into a tubular configuration bounding an enclosed cavity sized for receipt of the elongate member therein. The wall is woven with warp filaments extending generally parallel to the central longitudinal axis and weft filaments extending generally transversely to the warp filaments. The warp filaments include wire filaments and non-conductive warp filaments separate from the wire filaments. The weft filaments include heat-set filaments biasing the opposite edges into overlapping relation with one another and conductive filaments.

BRIEF DESCRIPTION OF THE DRAWINGS

These and other aspects, features and advantages will become readily apparent to those skilled in the art in view of the following detailed description of presently preferred embodiments and best mode, appended claims, and accompanying drawings, in which:

DETAILED DESCRIPTION OF PREFERRED EMBODIMENTS

Figure 1:
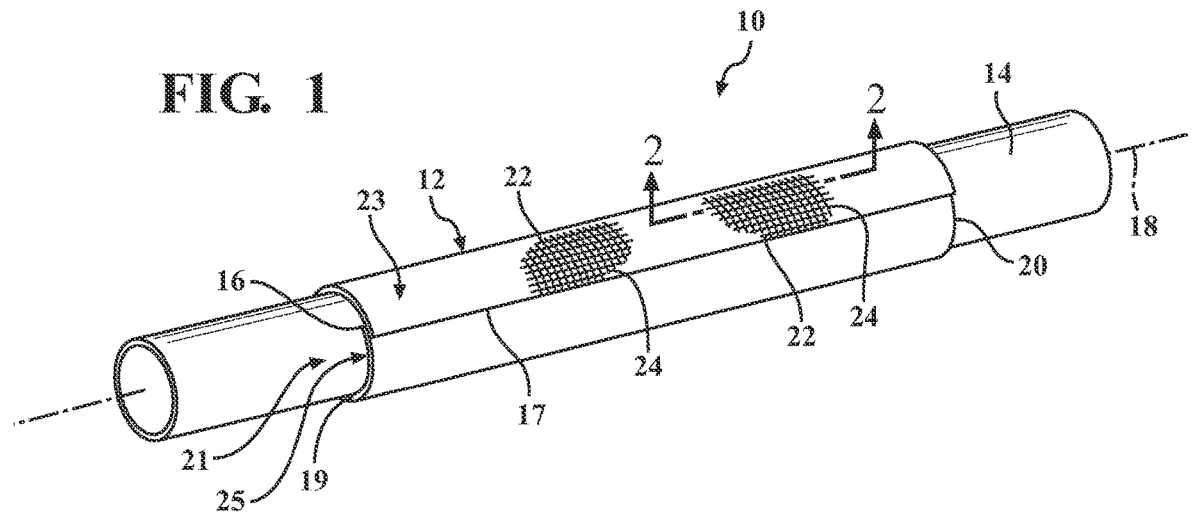
FIG. 1 is schematic perspective view of a woven, self-wrapping sleeve constructed in accordance with one aspect of the invention, with the sleeve shown carrying and protecting an elongate member therein.

Referring in more detail to the drawings, FIG. 1 shows a schematic representation of wrappable (shown wrapped in FIG. 1), abrasion resistant, EMI resistant woven sleeve, referred to hereafter as sleeve 10, constructed in accordance with one aspect of the invention. The sleeve 10 has a wrappable elongate wall 12 for routing and protecting an elongate member(s), such as conductive wires or a wire harness 14, for example, from exposure to EMI, abrasion, impact, and other environmental conditions, such as contamination from fluid and debris. The elongate wall 12 is abrasion resistant not only against abrasion to itself, but also against the elongate member 14 and against external components, such as neighboring wires, tubes and the like. Accordingly, the sleeve 10 resists causing abrasion to the elongate member 14 and to neighboring components. The wall 12 can be constructed having any suitable size, including length and diameter, depending on the application The wall 12 has opposite edges 16, 17 extending parallel or generally parallel (meaning though not truly parallel, they are only about 5 degrees or less from true parallel, and thus, to a casual observer, the edges 16, 17 would be seen and described as being parallel) to a central, longitudinal axis 18 between opposite ends 19, 21, wherein the edges 16, 17 are wrapped, via an internal bias in the wall 12, into overlapping relation with one another in "cigarette wrapped" fashion to fully enclose the elongate members 14 within a central cavity 21 of the sleeve 10. The cavity 21 is readily accessible along the full length of the wall 12, via separation of the opposite edges 16, 17 away from one another, so that the elongate member(s) 14 can be readily disposed radially, relative the axis 18, into the cavity 21, and conversely, removed from the cavity 21, such as during service.

Figure 2:
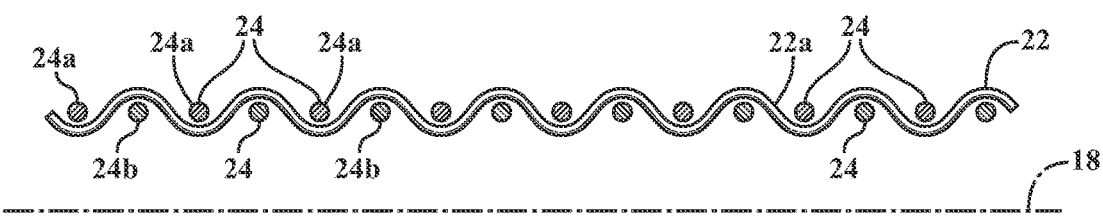
FIG. 2 is a cross-sectional side view of a portion of a wall of the sleeve taken generally along a line 2-2 of FIG. 1 illustrating a conductive wire filament woven in a lengthwise warp direction with a plurality of weft filaments shown in cross-section.
Figure 3A:
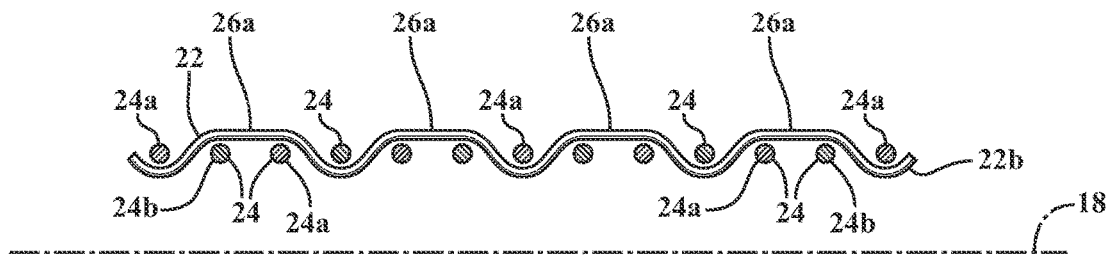
FIG. 3A is a view similar to FIG. 2 illustrating a non-conductive filament woven in a lengthwise warp direction with the plurality of weft filaments shown in cross-section.
Figure 3B:
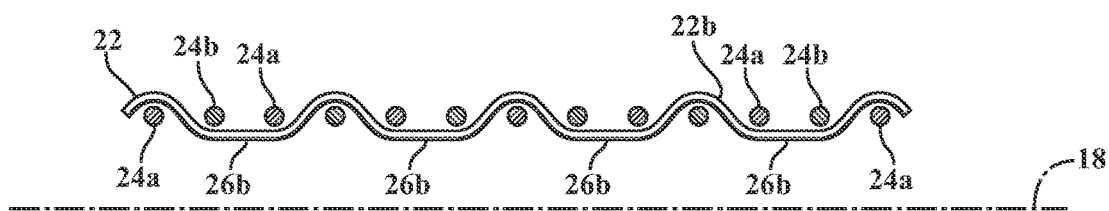
FIG. 3B is a view similar to FIG. 3A illustrating a non-conductive filament woven in a lengthwise warp direction with the plurality of weft filaments shown in cross-section.

As best shown in FIGS. 2-3B (illustrating a portion of the wall 12 looking along cross-sectional line 2-2, wherein the portion is representative of the entirety of the wall 12), the wall 12 is woven with warp filaments 22 extending parallel or generally parallel, as discussed above, to the central longitudinal axis 18 and weft filaments 24 extending circumferentially and transversely or generally transversely, with generally having the same meaning as discussed above, to the warp filaments 22. The warp filaments 22 include conductive warp wire filaments, also referred to as wires 22a, (FIG. 2) and non-conductive filaments 22b (FIGS. 3A and 3B, wherein FIGS. 3A and 3B can be separate embodiments or combined with one another in the same embodiment, thereby including both internal and external floats).

To provide EMI protection to the elongate member 14, the warp wire filaments 22a are electrically conductive wire, such as having a diameter between about 0.05-0.2 mm, and in one non-limiting embodiment, a diameter between 0.8-1.2 mm, by way of example and without limitation. The wires 22a can be provided as individual, separate continuous filaments, or bundled wire filaments, such as mini-braids of continuous wire filaments. The wires 22a can be provided having a copper core encapsulated by an outer layer of tin, or copper coated nickel, by way of example and without limitation. To optimize EMI protection, the wires 22a are woven in a plain weave pattern with the weft filaments 24, thereby passing over and under immediately adjacent weft filaments 24 in repeating fashion, as will be understood by a person possessing ordinary skill in the art of textile fabrics. It is contemplated herein that the wires 22a could be woven in any desired weave pattern, if desired, depending the application requirements.

Figure 4A:
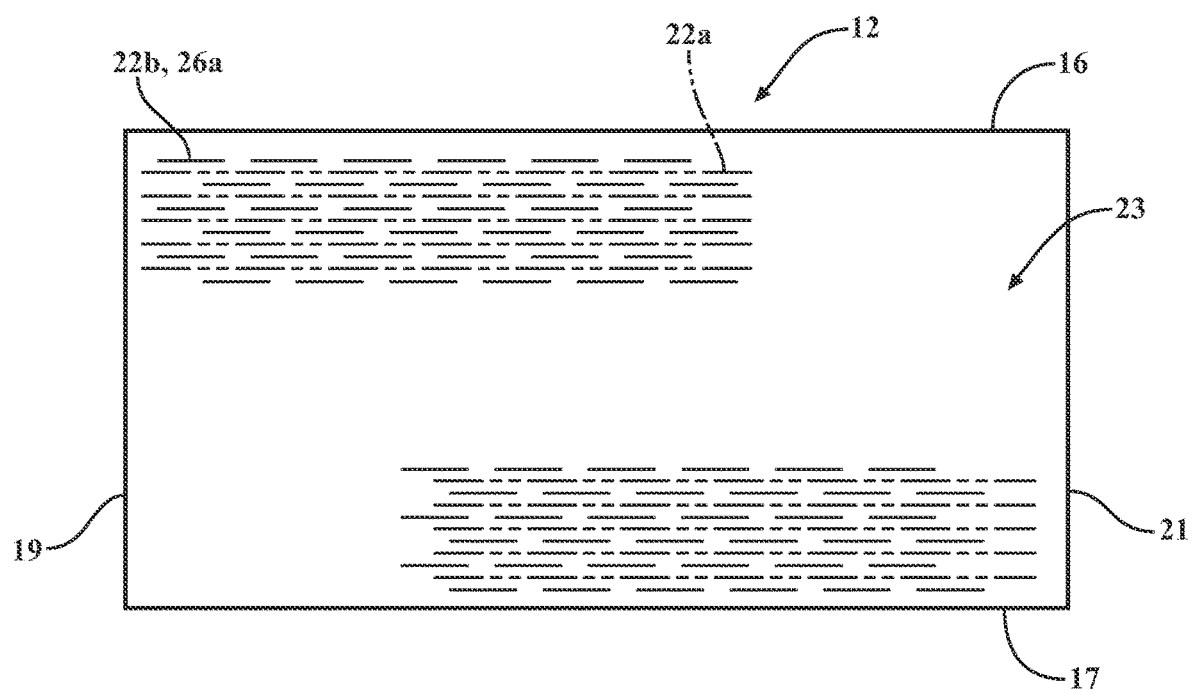
FIG. 4A is a plan view illustrating an outer surface of the wall of the sleeve shown in a flattened state.
Figure 4B:
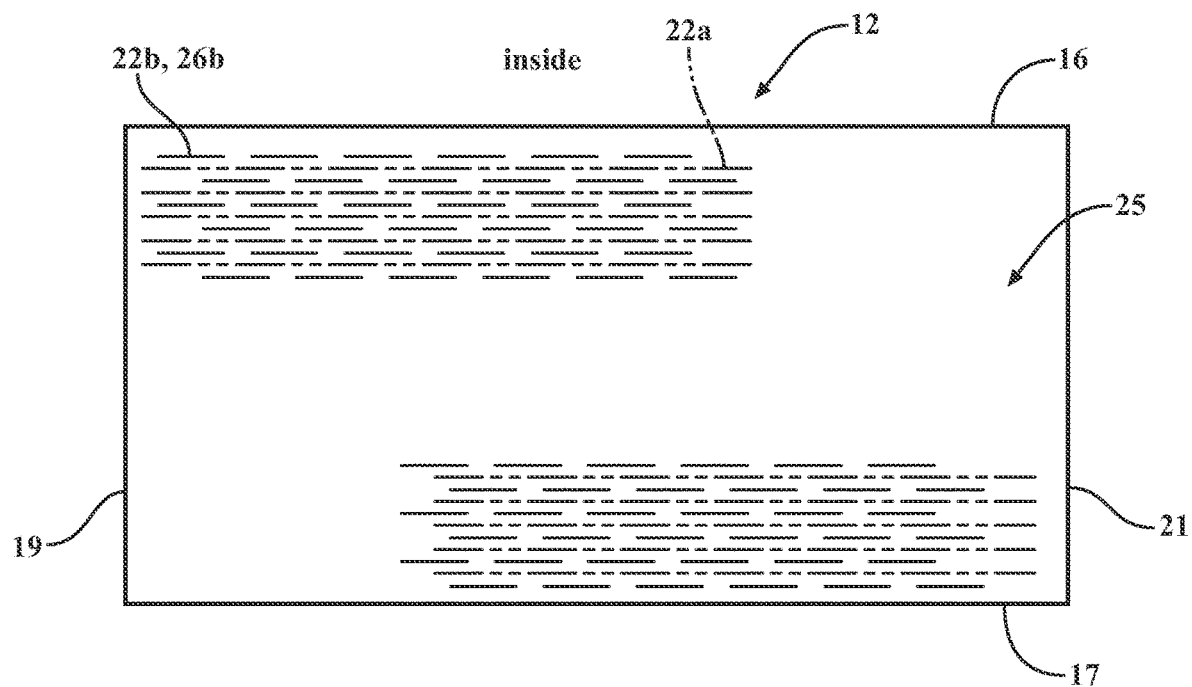
FIG. 4B is a plan view illustrating an inner surface of the wall of the sleeve shown in a flattened state.

To provide abrasion resistance to prevent abrading the elongate member 14 and neighboring components external and adjacent to the sleeve 10, the non-conductive warp filaments 22b are provided as non-abrasive, non-conductive filaments. To further enhance the non-abrading properties of the wall 12, the non-conductive warp filaments 22b can be provided having a larger diameter than the wires 22a, thereby preventing the wire 22a from making contact with an adjacent surface. Further yet, in accordance with an aspect of the invention, to prevent abrading the external components adjacent an outer surface 23 of the sleeve 10, the non-conductive warp filaments 22b can be woven in a weave pattern that forms external floats 26a (FIG. 3A; floats 26a extending along the exposed, outer surface 23 of the wall 12 and radially outwardly relative to the underlying weft filaments 24, thereby passing over two or more immediately adjacent weft filaments 24, under one weft filament 24, and then over two or more weft filaments 24, in repeating fashion, as will be understood by a person possessing ordinary skill in the art of textile fabrics. Circumferentially adjacent floats 26a, located in side-by-side relation with one another, can be woven in staggered relation relative to one another, such that the adjacent floats 26a of adjacent warp filaments 22b are not circumferentially aligned in mirrored, side-by-side fashion with one another, but rather, extend axially beyond one another, as shown in FIG. 4A. With the adjacent floats 26a being staggered, circumferentially extending annular valleys are not formed between the floats 26a, as illustrated in FIGS. 4A and 4B, thereby providing maximum shielding and abrasion protection to prevent the wires 22a from contacting the external component(s).

Further yet, in accordance with another aspect of the invention, to prevent abrading the elongate member 14 with the conductive warp wires 22a, the non-conductive warp filaments 22b are woven in a weave pattern that forms internal floats 26b (FIG. 3B; floats 26b extending along a concealed inner surface of the wall 12) extending radially inwardly relative to the overlying weft filaments 24, thereby passing under two or more immediately adjacent weft filaments 24, then over one weft filament 24, and then under two or more weft filaments 24, in repeating fashion, as will be understood by a person possessing ordinary skill in the art of textile fabrics. The floats 26b can be woven in circumferentially staggered relation relative to one another, as shown in FIG. 4B, such that adjacent floats 26b of adjacent warp filaments 22b are not circumferentially aligned in mirrored, side-by-side fashion with one another, but rather, extend axially beyond one another, thereby forming a plurality of cushions (each float 26b forms a separate cushion) for engagement with the elongate member 14 to protect the elongate member 14 against vibration and damage, and to prevent the wires 22a from contacting and abrading the elongate member 14. It is to be understood that the non-conductive warp yarns 22b can be woven as detailed above to form either or both the external and internal floats 26a, 26b in the wall 12.

The non-abrasive, non-conductive warp filaments 22b can be provided as synthetic monofilaments, having the desired diameter, and/or synthetic multifilaments, having the desired denier, as desired. The non-abrasive, non-conductive warp filaments 22b of the sleeve 10, when provided as multifilaments, can be provided as bulky, fluffy multifilaments to provide not only enhanced protection against impact forces, but also to provide loop portions for fixation of the sleeve 10 to an external fixation mechanism, shown as a hook portion 28 of a hook and loop type fixation mechanism. It is to be recognized that the hook portion 28 can be provided on any desired surface adjacent the sleeve 10, thereby allowing the loop portions provided by the multifilaments 22b to be attached to the hook portion 28. The non-abrasive, non-conductive warp filaments 22b and the wire filaments 22a can be woven in alternating relation with one another about the circumference of the wall 12, thereby having an equal number of ends, if desired.

The weft yarns 24 are provided as both heat-settable weft yarns 24a and conductive weft yarns 24b. The heat-settable weft yarns 24a and conductive weft yarns 24b can be woven to alternate with one another in spaced relation in a 1:1 ratio along the length of the sleeve 10. The heat-settable weft yarns 24a can be provided as polypropylene monofilaments, or as any other heat-settable material, including polyphenylene sulfide, polyethylene, by way of example and without limitation. The heat-settable weft yarns 24a are heat-set upon wrapping the wall 12 about a mandrel, thereby imparting an internal bias in the heat-set weft yarns 24a, such that the internal bias functions to bias and maintain the opposite edges 16, 17 in overlapped relation with one another. When desired to access the central cavity 21, the opposite edges 16, 17 can be biased away from one another by applying a suitable external force to spread the edges 16, 17 laterally away from one another, such as during assembly of the elongate member 14 into the central cavity 21 or during service of the elongate member 14.

Figure 5A:
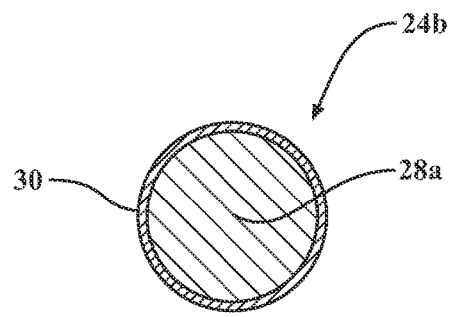
FIG. 5A is a cross-sectional view taken transversely to a lengthwise extending axis of a conductive metallized weft yarn in accordance with one aspect of the disclosure.
Figure 5B:
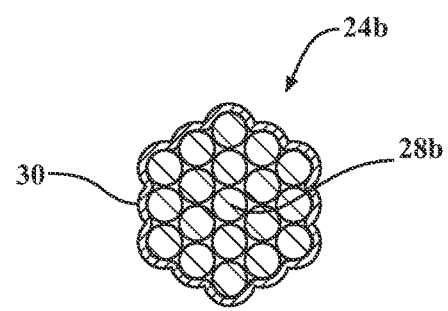
FIG. 5B is a cross-sectional view taken transversely to a lengthwise extending axis of a conductive metallized weft yarn in accordance with another aspect of the disclosure.
Figure 5C:
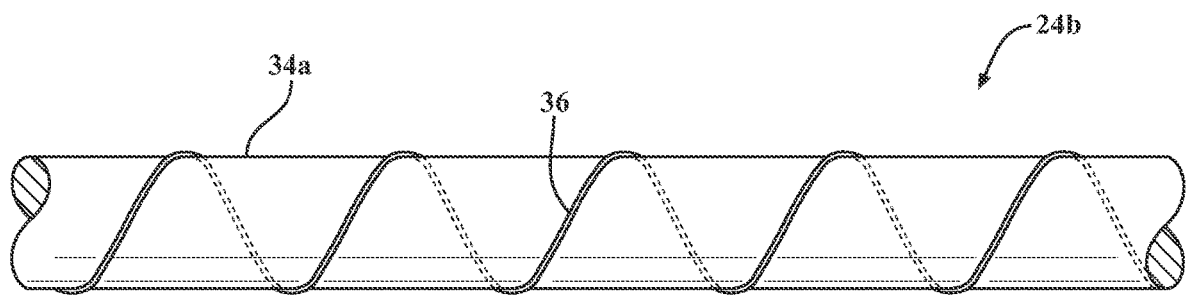
FIG. 5C is a fragmentary side view of a conductive hybrid yarn in accordance with one aspect of the disclosure.
Figure 5D:
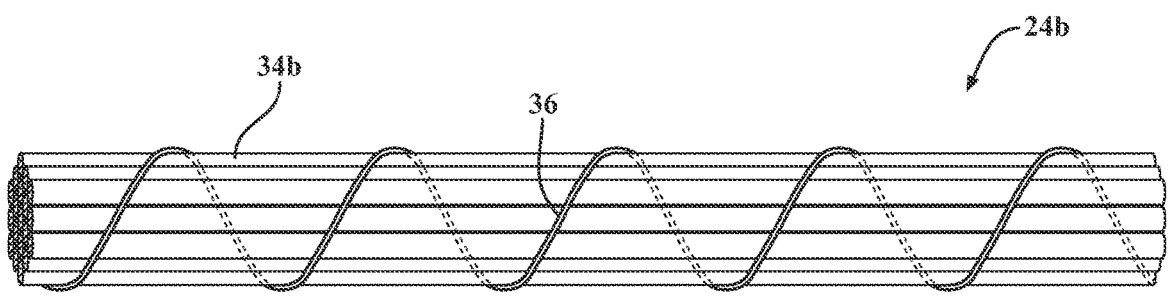
FIG. 5D is a fragmentary side view of a conductive hybrid yarn in accordance with another aspect of the disclosure.

The conductive weft yarns 24b can be provided as any suitable metallized synthetic yarn (FIGS. 5A and 5B), whether monofilament 28a (FIG. 5A) and/or multifilament 28b (FIG. 5B) coated and metallized by an outer coating 30 of metal, such as silver, and/or copper, and/or aluminum, or any suitable conductive metal or metal alloy. Otherwise, it is contemplated herein that the conductive weft yarns 24b can be provided as hybrid yarns 32 (FIGS. 5C and 5D) including a non-conductive synthetic yarn, whether monofilament 34a (FIG. 5C) or multifilament (FIG. 5D), twisted or served with a continuous conductive wire 36, such as discussed above for wire filaments 22a. The conductive weft yarns 24b are suitably flexible to allow the heat-set weft yarns 24a to bias the opposite edges 16, 17 into overlapping relation with one another, as discussed above. The conductive weft yarns 24b are woven in electrical communication with the warp wires 22a, thereby improving the EMI performance of the sleeve 10.

Obviously, many modifications and variations of the present invention are possible in light of the above teachings. It is contemplated that all features of all claims and of all embodiments can be combined with each other, so long as such combinations would not contradict one another. It is, therefore, to be understood that within the scope of the appended claims, the invention may be practiced otherwise than as specifically described.

What is claimed is:

1. A wrappable, woven EMI resistant sleeve for routing and protecting an elongate member, comprising:
    a wall having opposite edges extending lengthwise between opposite ends, said wall being wrapped about a central longitudinal axis into a tubular configuration bounding an enclosed cavity sized for receipt of the elongate member therein, said wall being woven with warp filaments extending generally parallel to said central longitudinal axis and weft filaments extending generally transversely to said warp filaments, said warp filaments including conductive warp filaments and non-conductive warp filaments, said weft filaments including heat-set filaments biasing said opposite edges into overlapping relation with one another and conductive weft filaments,
    wherein said non-conductive warp filaments form floats extending over and/or under two or more of said weft yarns,
    wherein said conductive warp filaments are woven in a plain weave pattern.

2. The wrappable, woven EMI resistant sleeve of claim 1, wherein circumferentially adjacent ones of said floats are staggered relative to one another, such that the circumferentially adjacent floats extend axially beyond one another.

3. The wrappable, woven EMI resistant sleeve of claim 1, wherein said heat-set filaments and said conductive weft filaments alternate with one another.

4. The wrappable, woven EMI resistant sleeve of claim 1, wherein said conductive weft filaments are metallized filaments.

5. The wrappable, woven EMI resistant sleeve of claim 4, wherein said metallized filaments are metallized multifilaments.

6. The wrappable, woven EMI resistant sleeve of claim 4, wherein said metallized filaments are metallized monofilaments.

7. The wrappable, woven EMI resistant sleeve of claim 1, wherein said conductive warp filaments are hybrid filaments including a synthetic yarn having a conductive wire filament twisted or served thereabout.

8. The wrappable, woven EMI resistant sleeve of claim 7, wherein said synthetic yarn is a multifilament.

9. The wrappable, woven EMI resistant sleeve of claim 7, wherein said synthetic yarn is a monofilament.

10. The wrappable, woven EMI resistant sleeve of claim 1, wherein said non-conductive warp filaments and said conductive warp filaments alternate with one another in spaced relation about a circumference of said wall.

11. The wrappable, woven EMI resistant sleeve of claim 1, wherein at least some of the floats form a plurality of external floats extending along an exposed outer surface of the wall.

12. The wrappable, woven EMI resistant sleeve of claim 11, wherein at least some of the floats form a plurality of cushions extending along a concealed inner surface of the wall for engagement with the elongate member to protect the elongate member against vibration and damage.

13. A wrappable, woven EMI resistant sleeve for routing and protecting an elongate member, consisting of:
   a single layer wall having opposite edges extending lengthwise between opposite ends, said wall being wrapped about a central longitudinal axis into a tubular configuration bounding an enclosed cavity sized for receipt of the elongate member therein, said wall being woven with warp filaments extending generally parallel to said central longitudinal axis and weft filaments extending generally transversely to said warp filaments, said warp filaments including wire filaments and non-conductive warp filaments separate from said wire filaments, said weft filaments including heat-set filaments biasing said opposite edges into overlapping relation with one another and conductive weft filaments,
   wherein said non-conductive warp filaments form floats extending over and/or under two or more of said weft yarns,
   wherein said wire filaments are woven in a plain weave pattern.

14. The wrappable, woven EMI resistant sleeve of claim 13, wherein said conductive weft filaments are hybrid filaments including a synthetic yarn having a conductive wire filament twisted or served thereabout.

15. The wrappable, woven EMI resistant sleeve of claim 14, wherein at least some of the floats extend over two or more of said weft yarns along an outer surface of the wall to form loop portions of a hook and loop type fastener and wherein at least some of the floats form a plurality of cushions extending along a concealed inner surface of the wall for engagement with the elongate member to protect the elongate member against vibration and damage.

16. The wrappable, woven EMI resistant sleeve of claim 13, wherein said conductive weft filaments are metallized filaments.

17. The wrappable, woven EMI resistant sleeve of claim 16, wherein said metallized filaments are metallized multifilaments and/or metallized monofilaments.

18. The wrappable, woven EMI resistant sleeve of claim 1, wherein said conductive warp filaments are wire filaments.

19. The wrappable, woven EMI resistant sleeve of claim 18, wherein said wire filaments have a copper core and an outer layer of tin or nickel.

20. The wrappable, woven EMI resistant sleeve of claim 18, wherein said wire filaments are provided as mini-braids.

* * * * *